3,268,486
PROCESS FOR PREPARING POLYESTERS
Arie Klootwijk, Amsterdam, Netherlands, assignor to Shell Oil Company, New York, N.Y., a corporation of Delaware
No Drawing. Filed Apr. 30, 1964, Ser. No. 363,992
Claims priority, application Netherlands, June 28, 1963, 294,714
5 Claims. (Cl. 260—78.3)

This invention relates to a process for preparing high molecular weight polyesters from cyclic anhydrides of hydroxy-carboxylic acids. More particularly, this invention relates to a process of polymerizing said anhydrides using a catalyst selected from phosphines, arsines, stibines, and addition products hereof, whereby high molecular weight polyesters are obtained.

It has been known that lactones polymerized to form polyesters of generally less than ten monomer units, often merely upon standing at room temperature. French Patent No. 1,231,163 reports linear polyesters, having molecular weight of from 5,000 to 10,000 prepared from beta-lactones in the presence of a catalyst, such as tertiary amines and pentalfluorides of phosphorus, arsenic, and antimony.

I have now found that linear polyesters of lactones and lactides having 3 to 8 carbon atoms in the lactone ring may be prepared whose molecular weights range from 15,000 to 200,000 or more, when certain organic compounds of phosphorus, arsenic, antimony or addition compounds thereof are employed as catalysts. The process of this invention in many instances achieves increased polymerization rates and proceeds at lower temperatures than have heretofore been observed.

According to this invention, high molecular weight polymers and copolymers of lactones and lactides are prepared in a relatively short time by contacting one or more lactones or lactides in a reaction vessel at a temperature ranging from 0 to 150° C. with one or more catalysts selected from phosphines, arsines, stibines and addition compounds thereof.

The linear polyesters according to this invention contain in their chain a repeating unit selected from

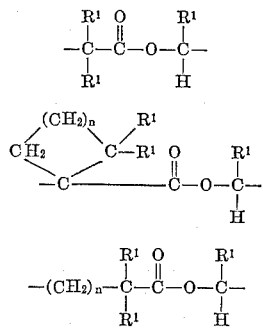

and

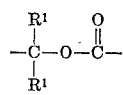

wherein $R^1$ is selected from hydrogen, hydrocarbon radicals and hydrocarbon radicals wherein one or more of the hydrogen atoms of the hydrocarbon radicals may be replaced by a substituent, such as a halogen atom or a hydroxyl group, and "$n$" is an integer selected from 1 to 5. Preferably, $R^1$ is selected from hydrogen and alkyl groups having from 1 to 4 carbon atoms, i.e., methyl, propyl, isopropyl, tertiary butyl, etc. By the process of this invention linear polyesters are formed by ring-opening polymerization of lactones and lactides in the presence of special catalysts, described in detail hereinafter. The term "polymerization" as used herein includes copolymerization, such as, for example, polymerization of lactones and lactides with each other, or with other polymerizable compounds, such as epoxides.

Lactones for use in the process of this invention are those of formula

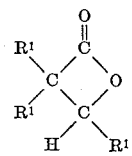

the beta-lactones wherein $R^1$ is selected from hydrogen, aliphatic and aromatic radicals, such as alkyl, cycloalkyl, haloalkyl, hydroxyalkyl, alkoxy, phenyl, alkaryl, hydroxyaryl and haloaryl. The preferred lactones are those wherein $R^1$ is selected from hydrogen and an alkyl group having from 1 to 4 carbon atoms. Examples of these beta-lactones are: beta-propiolactone; alpha-methyl beta-propiolactone; alpha,alpha-dimethyl-beta-propiolactone; alpha-methyl-alpha-ethyl-beta-propiolactone; alpha-ethyl-beta-propiolate; anl alpha-methyl-alpha-tert-butyl-beta-propiolactone.

Another group of lactones suitable for polymerization in the process of this invention are those of the formula

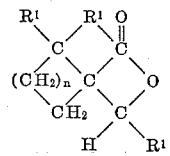

wherein $R^1$ has the same significance as above and "$n$" is a positive integer selected from 1 to 5. Examples of lactones of this structure are: 2-oxa-4-spiro-[3,6]-decanone-1; 2-oxa-4-spiro-[3,5]-nonanone-1; 5-methyl-2-oxa-4-spiro-[3,5]-nonanone-1; 2-oxa-4-spiro-[3,2]-hexanone-1; and 5,5-dimethyl-2-oxa-4-spiro-[3,4]-octanone-1.

Still another group of suitable lactones are those of the formula

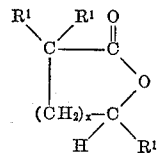

wherein $R^1$ and "$n$" are as previously defined such as delta-valerolactone, alpha,alpha-dimethyl-delta-velerolactone and epsilon-caprolactone.

Lactides suitable for use in the process of this invention are those of the formula

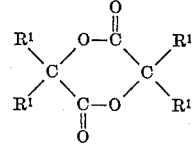

wherein $R^1$ is as defined above. Examples of lactides of the above formula are glycolide and lactide.

The catalysts to be used according to the process of this invention include the phosphines, arsines and stibines, represented by the formula

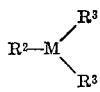

wherein $R^2$ is a hydrogen radical which may contain substituent groups, $R^3$ is selected from hydrogen and $R^2$ radicals and M is selected from phosphorus, arsenic and antimony. Preferably, $R^2$ is an alkyl or phenyl radical, such as ethyl, butyl or phenyl which may contain substituent groups, such as for example chloroethyl and hydroxyethyl. Of the substituents that may occur in the hydrocarbon radicals of the catalysts, the preferred are halogens and hydroxy groups, e.g., haloalkyl, hydroxyalkyl and chlorophenyl radicals.

The most active of these catalysts are the phosphines, especially those in which the phosphorus atom is attached to three hydrocarbon radicals, and in particular, those in which the three hydrocarbon radicals are alkyl groups wherein the total number of carbon atoms of said catalyst ranges from 3 to 9.

Examples of suitable phosphines are: trimethylphosphine; triethylphosphine; tri(beta-chloroethyl)phosphine; tri(beta-hydroxyethyl)phosphine; tripropylphosphine; tri-isopropylphosphine; methyldiethylphosphine; tri-n-butylphosphine; diethyl-n-butylphosphine; dimethylhexylphosphine; triphenylphosphine; diethylphosphine; di-n-propylphosphine; diisopropylphosphine; dibutylphosphine; monobutylphosphine; and monophenylphosphine.

Suitable arsines and stibines for use in this invention include compounds similar to the above phosphines with the exception that either arsenic or antimony is present in place of phosphorus.

Catalysts suitable for use in this invention also include addition compounds, referred to as co-ordinate compounds, formed from phosphines, arsines and stibines by addition of compounds in which hydrogen atoms and/or hydrocarbon radicals are attached to hydroxyl groups and/or acid radicals. Examples of compounds of this type are tetraethylphosphonium bromide and tetraethylphosphonium hydroxide, as well as, the corresponding arsonium and stibonium compounds. Compounds of this type have the formula $$M(R^3)_4X$$

wherein M and $R^3$ are as previously defined and X is selected from halogen atoms and a hydroxyl group.

Although the polymerization according to this invention is possible without a diluent, use thereof is recommended since a diluent makes it easier to work up the polymer. Suitable diluents are aliphatic hydrocarbons, such as 2,2-trimethylpentane and cyclohexane. Also useful are aromatic hydrocarbons, such as chloroform; nitrated hydrocarbons such as dinitrobenzene; ethers such as dioxane, tetrahydrofuran and the dimethyl ether of glycol; esters, such as ethyl acetate, isopropyl acetate and butyl acetate; and nitriles such as acetonitrile. Suitable concentrations of the monomer in the diluent are generally between 2 and 50% by weight, based on the total mixture. The presences of water during polymerization should be avoided as much as possible.

The concentration of catalyst in the reaction mixture may vary considerably, but will generally lie between 0.001 and 10% by weight, and usually between 0.1 and 1% by weight, based on the total monomer.

The temperature at which polymerization takes place is usually maintained in the range of from 0 to 150° C. Temperatures below 0° C. and above 150° C., however may in special cases offer advantages.

Monomers that may be polymerized with the lactones and lactides are, for example, epoxy compounds, such as ethylene oxide, propylene oxide, epichlorohydrin and glycidyl ethers and esters, and also lactams, such as caprolactam.

Copolymerization of the lactones and lactides with each other may be conducted in various ways, so that the type of products may be varied. For example, if the ratio between the concentrations of the various monomers remains constant during polymerization, the copolymer produced will consist of the various monomers in the same ratio; also if there is initially only one monomer present in the reaction mixture and another is not added until the first has homopolymerized for a period, copolymer chains, called block copolymers will be produced in which segments consisting entirely of the first monomer will be attached to segments consisting of the second monomer.

The polymerization according to this invention may be carried out either batchwise or continuously. In a continuous process employing, for example, a tubular reactor wherein the reacting mixture flows through one or more reactors in which the reaction mixture is stirred, there are means provided for introducing monomer, catalyst and, if desired, diluent and means provided for withdrawing the mixture formed.

The polymers obtained according to this invention exhibit very attractive properties. They withstand relatively high temperatures, and in many cases have a very high softening point, while possessing satisfactory mechanical properties. These polymers are suitable for numerous applications, such as the manufacture of threads, fibers and films and the molding of objects.

To illustrate the manner in which the invention may be carried out, the following examples are given. It is understood, however, that the examples are for the purposes of illustration and the invention is not to be regarded as limited to any of the specific materials or conditions therein.

EXAMPLE I

*Polymerization of beta-propiolactone and of alpha,alpha-dimethyl-beta-propiolactone at room temperature*

Traces of water and other compounds containing active hydrogen are removed from each monomer by distillation, 2 percent by weight of toluene diisocyanate being added thereto. Then with the careful exclusion of water and oxygen, each monomer is mixed at 20° C. with 0.2% mol of triphenylphosphine. After some time, polymerization is discontinued by addition of ethanol, which renders the catalyst inactive. Excess monomer and catalyst residues are removed by washing with ethanol. The product in each case is then dried in vacuum at 50° C. The results obtained are listed in the Table I below. The intrinsic viscosity (I.V.) expressed as deciliters per gram (dl./g.) is derived from viscosity measurements in solutions of the product in trifluoracetic acid at 25° C.

TABLE I

| Monomer | Time, Hours | Conversion, Percent | Melting Point, °C. | I.V., dl./g. |
|---|---|---|---|---|
| Beta-propiolactone | 48 | 95 | 85 | 0.40 |
| Alpha,alpha-dimethyl-beta-propiolactone | 20 | 95 | 230 | 4.0 |

EXAMPLE II

*Polymerization of alpha,alpha-dimethyl-beta-propiolactone—Varied conditions*

The monomer is purified according to the procedure of Example I and then mixed with twice its volume of 2,2,4-trimethylpentane. The catalyst, temperature and reaction time of the process are varied as shown in Table II below. The amount of catalyst is always 0.2% mol, based on the total monomer used. Polymerization is discontinued by addition of ethanol. The polymer formed is separated by filtration, washed with ethanol and dried in vacuum at 50° C.

TABLE II

| Catalyst | Temperature, °C. | Time, Hours | Conversion, Percent | Melting Point, °C. | I.V., dl./g. |
|---|---|---|---|---|---|
| $(C_4H_9)_3P$ | 95 | 20 | 98 | 235 | 2.3 |
|  | 40 | 20 | 97 |  | 1.8 |
|  | 95 | 2.5 | 95 |  | 3.7 |
| $(C_6H_5)_3P$ | 95 | 20 | 98 | 238 | 3.8 |
|  | 50 | 20 | 94 |  | 4.8 |
| $(C_6H_5CH_2)_3P$ | 95 | 20 | 95 |  |  |
| $(C_6H_5)_3As$ | 95 | 20 | 96 | 237 | 3.5 |

EXAMPLE III

*Polymerization of alpha,alpha-dimethyl-beta-propiolactone—Yield as function of amount of catalyst and reaction time*

The initial concentration of monomer is 5% by volume and the catalyst is triphenylphosphine, in various amounts (0.4 to 1.0% mol based on the total monomer). The temperature is maintained at 90° C. and 2,2,4-trimethylpentane is employed as a diluent. Other conditions are as in Example II. The yields obtained are listed in Table III below.

TABLE III

| Time, Hours | 4 | 10 | 20 | 32 | 48 |
|---|---|---|---|---|---|
|  | Percent yield | | | | |
| Percent mol of Catalyst: | | | | | |
| 0.4 | 10 | 23 | 45 | 69 | 88 |
| 0.6 | 24 | 54 | 83 | 95 | 98 |
| 1.0 | 47 | 79 | 95 | 98 | 99 |

EXAMPLE IV

*Polymerization of glycolide*

200 grams of glycolide (the lactide of glycolic acid) are mixed with 900 grams of dioxan and 1% mol of triethylphosphine, based on the glycide. Upon cooling, the polymer crystallized out. The homogeneous reaction mixture is filtered off, washed with ethanol and dried in vacuum. The yield is 74 grams. Melting point: 216–219° C.

EXAMPLES V–VIII

*Polymerization of alpha,alpha-dimethyl-beta-propiolactone*

The procedure of Example I is repeated in four separate runs with the exception that a different catalyst is substituted for the triphenylphosphine of Example I in each of the runs, i.e., trimethylphosphine, triethylstibine, methyldiethylarsine and tetraethylphosphonium bromide. Similar results are obtained in each instance.

EXAMPLES IX AND X

*Polymerization of delta-valerolactone and 2-oxa-4-spiro-(3,6)-decanone-1*

Two separate runs are carried out according to the process of Example I with the exception that in one run delta-valerolactone and in the other run 2-oxa-4-spiro-(3,6)-decanone-1 is substituted for the alpha,alpha-dimethyl-beta-propiolactone of Example I. Results similar to those obtained in Example I are obtained here.

EXAMPLE XI

*Copolymerization of alpha,alpha-dimethyl-beta-propiolactone and glycolide*

The procedure of Example IX is repeated with the exception that in place of 200 grams of glycolide 100 grams each of alpha,alpha-dimethyl-beta-propiolactone and glycolide are mixed with 900 grams of dioxan. The resulting polyester consisted of the above monomers in equal proportions, i.e., a ratio of 1:1.

I claim as my invention:

1. A process for preparing polyesters having a molecular weight of from 15,000 to 200,000 and which are represented by the repeating unit

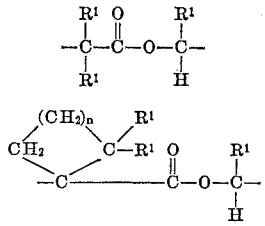

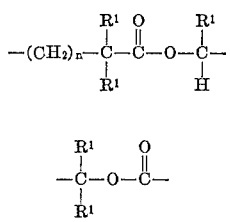

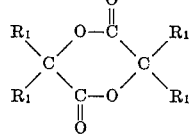

and

wherein $R^1$ is selected from the group consisting of hydrogen and alkyl groups having from 1 to 4 carbon atoms and "n" is a integer selected from 1 to 5; which comprises polymerizing at least one cyclic anhydride selected from the group consisting of

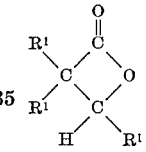 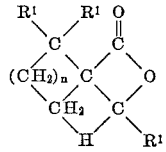 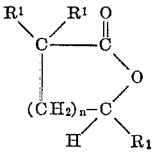

and

wherein $R^1$ and "n" are as previously defined; by contacting said anhydride with at least one catalyst selected from the group consisting of

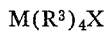

and $$M(R^3)_4X$$

wherein $R^2$ is selected from the group consisting of alkyl, haloalkyl, hydroxyalkyl, and phenyl, $R^3$ is selected from the group consisting of $R^2$ and hydrogen, M is selected from the group consisting of phosphorus, arsenic and antimony and X is selected from the group consisting of a halogen atom and a hydroxyl group; wherein the catalyst is present in an amount ranging from 0.001% to 10% by weight, based on the total amount of said anhydride present.

2. A process according to claim 1 wherein the catalyst is of the formula $$R^2-M\begin{matrix}R^3\\R^3\end{matrix}$$

in which M is phosphorus and $R^2$ and $R^3$ are alkyl groups wherein the total number of carbon atoms ranges from 3 to 9.

3. A process according to claim 1 wherein the catalyst is triphenylphosphine.

4. A process according to claim 3 wherein the process is conducted at a temperature within the range of from 0° C. to 150° C.

5. A process for preparing a polyester having in its chain the repeating unit,

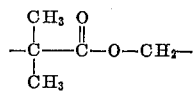

which comprises contacting a solution consisting essentially of about 5% by volume of alpha,alpha-dimethyl-beta-propiolactone and about 95% by volume of 2,2,4-trimethylpentane with about 1% by weight, based on said lactone, of triphenylphosphine at a temperature of about 90° C.

References Cited by the Examiner
UNITED STATES PATENTS
3,021,310    2/1962    Cox et al. _____ 260—78.3

JOSEPH L. SCHOFER, *Primary Examiner.*
L. WOLF, *Assistant Examiner.*